United States Patent
Zheng et al.

(10) Patent No.: US 10,068,082 B1
(45) Date of Patent: Sep. 4, 2018

(54) SYSTEMS AND METHODS FOR MAINTAINING SPLIT KNOWLEDGE OF WEB-BASED ACCOUNTS

(71) Applicant: FMR LLC, Boston, MA (US)

(72) Inventors: Erkang Zheng, Cary, NC (US); Jason Jay Kao, Cary, NC (US); Paul Michael Vetrano, Franklin, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/815,465

(22) Filed: Nov. 16, 2017

(51) Int. Cl.
*G06F 21/34* (2013.01)
*G06F 21/45* (2013.01)
*G06F 21/60* (2013.01)
*H04L 29/06* (2006.01)
*G06F 21/62* (2013.01)

(52) U.S. Cl.
CPC .............. *G06F 21/34* (2013.01); *G06F 21/45* (2013.01); *G06F 21/606* (2013.01); *G06F 21/6218* (2013.01); *H04L 63/0838* (2013.01); *H04L 63/0846* (2013.01); *H04L 2463/082* (2013.01)

(58) Field of Classification Search
CPC ........ G06F 21/34; G06F 21/606; G06F 21/45; G06F 21/6218; H04L 63/0846; H04L 63/0838; H04L 2463/082
See application file for complete search history.

(56) References Cited

U.S. PATENT DOCUMENTS

| 8,484,701 B2* | 7/2013 | Murphy | G06F 21/34 726/3 |
| 9,332,008 B2* | 5/2016 | Burch | H04L 63/0838 |
| 9,628,875 B1* | 4/2017 | Roth | H04Q 5/22 |
| 9,639,825 B1* | 5/2017 | Roth | G06Q 10/10 |
| 2010/0199336 A1* | 8/2010 | Tan | H04L 63/0846 726/6 |
| 2012/0240195 A1* | 9/2012 | Weiss | H04L 63/0846 726/4 |

(Continued)

OTHER PUBLICATIONS

Google Account Help; Install Google Authenticator; "https://support.google.com/accounts/answer/1066447?hl=en"; Jul. 1, 2017 via Wayback Machine Internet Archive.*

(Continued)

*Primary Examiner* — Nelson Giddins
(74) *Attorney, Agent, or Firm* — Proskauer Rose LLP

(57) ABSTRACT

Systems and methods for enabling multi-factor authentication for a web-based account. A first computing device and a second computing device are accessible to a first user. A backend system is accessible to a second user. The backend system communicates with the second computing device via a secure communication network. The first user creates a web-based account and receives a MFA initiation screen including secret information and a field for entering at least one TOTP token. The backend system has a TOTP token generator. The second computing device captures the secret information and transmits it to the backend system. The second user generates at least one TOTP token using the backend system and transmits the at least one TOTP token to the second computing device. The first user enters the at least one TOTP token into the first computing device. The account can then be validated and MFA enabled.

19 Claims, 3 Drawing Sheets

(56) References Cited

U.S. PATENT DOCUMENTS

| | | | | |
|---|---|---|---|---|
| 2014/0122730 | A1* | 5/2014 | Burch | H04L 67/146 709/228 |
| 2014/0245396 | A1* | 8/2014 | Oberheide | H04L 63/08 726/4 |
| 2015/0106897 | A1* | 4/2015 | Davis | H04L 63/083 726/7 |
| 2015/0339486 | A1 | 11/2015 | Shetye | |
| 2016/0140333 | A1* | 5/2016 | Samineni | G06F 21/36 726/19 |
| 2016/0197914 | A1* | 7/2016 | Oberheide | H04L 63/0838 713/183 |
| 2016/0212103 | A1* | 7/2016 | Rhoads | H04W 12/02 |
| 2016/0248752 | A1* | 8/2016 | Blinn | H04L 63/083 |
| 2016/0366589 | A1* | 12/2016 | Jean | H04L 63/083 |
| 2017/0006026 | A1* | 1/2017 | An | H04L 63/0838 |
| 2017/0032111 | A1* | 2/2017 | Johansson | G06F 21/31 |
| 2017/0046531 | A1* | 2/2017 | Roberts | G06F 21/6218 |
| 2017/0118025 | A1* | 4/2017 | Shastri | G06F 21/32 |
| 2017/0195123 | A1* | 7/2017 | Oberheide | H04L 9/3247 |
| 2017/0264602 | A1* | 9/2017 | Roth | H04L 63/08 |
| 2017/0331801 | A1* | 11/2017 | Mezei | H04L 63/067 |
| 2017/0357799 | A1* | 12/2017 | Feher | G06F 21/45 |
| 2017/0359723 | A1* | 12/2017 | Pal | H04L 63/0853 |
| 2018/0007025 | A1* | 1/2018 | Oberheide | H04L 63/083 |
| 2018/0007046 | A1* | 1/2018 | Oberheide | H04L 63/0876 |

OTHER PUBLICATIONS

Ting, "2-Step Verification with Google Authenticator | Ting Tip", Nov. 7, 2017, YouTube, "https://www.youtube.com/watch?v=mVlxzH4EWmA", 1:40-2:30.*

M'Raihi, et al. "TOTP: Time-Based One-Time Password Algorithm", May 2011, Internet Engineering Task Force, Request for Comments: 6238, p. 1-16.*

* cited by examiner

300

305 Providing a first computing device accessible to a first user and configured with Internet access, a second computing device accessible to the first user, and a backend system accessible to a second user, the backend system in communication with the second computing device via a secure communication network and having a TOTP token generator and an application programming interface.

310 Creating, by the first user, a web-based account having a username and a password.

315 requesting, by the first user, via the first computing device, to enable multi-factor authentication for the web-based account.

320 Displaying, for the first user, via the first computing device, a multi-factor authentication initiation screen including secret information and at least one data field for entering at least one TOTP token.

325 Capturing, by the second computing device, the secret information in memory.

330 Transmitting, by the second computing device, the secret information over the secure communication network to the backend system via the application programming interface.

335 Generating, by the second user, using the TOTP token generator, the at least one TOTP token.

340 Transmitting, by the second user, via the application programming interface, the at least one TOTP token to the second computing device, the second computing device displaying the at least one TOTP token on a token screen.

345 Entering, by the first user, via the multi-factor authentication initiation screen, the at least one TOTP token into a corresponding data field of the at least one data field.

350 Receiving, by the first computing device, from the web-based account, validation of the at least one TOTP token, thereby confirming activation of multi-factor authentication for the web-based account.

FIG. 3

SYSTEMS AND METHODS FOR MAINTAINING SPLIT KNOWLEDGE OF WEB-BASED ACCOUNTS

TECHNICAL FIELD

This application relates generally to systems, methods and apparatuses, including computer programs, for providing secure access to web-based accounts. More specifically, this application relates to increasing security for a web-based account by splitting, between a first user and a second user, knowledge needed to access the account.

BACKGROUND

For many years, web-based accounts have used multi-factor authentication (MFA) techniques to provide greater security than an account password alone provides, particularly for accounts having sensitive or valuable information. In one typical use case, a user opens a cloud account (e.g., an AWS® account) having a username and a password. For additional security, the user has the option to configure virtual (or hardware) MFA, which requires that another piece of authenticating information (e.g., an MFA possession factor) be provided before the user gains access to the account. Specifically, using virtual MFA, the user provides a time-based one-time password (TOTP) token generated by a TOTP-compatible application (e.g., Google Authenticator or Authy) hosted on a secondary device (e.g., a mobile device such as a smart phone). The TOTP token must be provided in addition to the username and password to gain access to the account.

One limitation of the above setup, particularly in enterprise environments, is that the account holder ultimately holds access to all of the information needed to gain access to the account, thus giving the account holder a "key to the kingdom." What is needed is a configuration that further increases security and mitigates risk of breach by any one individual by maintaining separation of the knowledge required to access a critical account, so that at least two individuals (or teams) must come together to gain access to the account.

SUMMARY

Accordingly, the invention provides systems, methods and apparatuses to separate knowledge of critical accounts so that security is heightened, particularly for critical accounts in enterprise environments. For example, the root user of an AWS® cloud account (e.g., a development lead on a project) can hold the root account password, while a second user (e.g., a security official or team) can hold access to one or more TOTP tokens generated on a backend system. Under this configuration, the first and second users must work together to gain access to the account.

More specifically, the account holder creates the account and then places a request to enable virtual MFA for the account. At this point, the account holder must contact the security team in real time to gain access to the TOTP tokens needed to enable virtual MFA. To facilitate this communication, systems and methods for transmitting the shared secret required to generate the TOTP tokens are provided. In this way, the invention enables full self-service of account setup while maintaining split knowledge of the information required to access the account. Without the invention, the two would need to come together physically (or virtually) at the time of setup, adding expense, aggravation and delay to the account setup process.

In one embodiment, the invention uses two main components in secure communication with each other: (1) a mobile application (e.g., installed on a mobile phone accessible by the account holder) and (2) a backend application (e.g., installed on a backend system accessible by a security team). A first user creates an account and requests to enable MFA, and the account provides a one-time shared secret used to set up MFA. The mobile application captures the shared secret provided by the account setup screen for enrollment purposes and acts as a proxy to communicate with the token management system in the backend, to which the account holder does not have access. The mobile application then securely communicates the shared secret to the backend system, which uses the shared secret to generate one or more TOTP tokens. The backend system then provides the generated TOTP tokens to the account holder, who can enter them into the account setup screen. If the setup is successful, the user receives a prompt that MFA has been enabled. The user can then save account details on the backend system using the mobile application. Thus, identifying information can be added for the first user, with the backend system storing a unique identifier for account identification and the shared secret.

In one aspect, the invention features a computerized method of enabling multi-factor authentication for a web-based account. The method includes providing a first computing device accessible to a first user and configured with Internet access, a second computing device accessible to the first user, and a backend system accessible to a second user. The backend system is in communication with the second computing device via a secure communication network. The backend system has a TOTP token generator and an application programming interface. The method also includes creating, by the first user, a web-based account having a username and a password. The method also includes requesting, by the first user, via the first computing device, to enable multi-factor authentication for the web-based account. The method also includes displaying, for the first user, via the first computing device, a multi-factor authentication initiation screen including secret information and at least one data field for entering at least one TOTP token. The method also includes capturing, by the second computing device, the secret information in memory. The method also includes transmitting, by the second computing device, the secret information over the secure communication network to the backend system via the application programming interface. The method also includes generating, by the second user, using the TOTP token generator, the at least one TOTP token. The method also includes transmitting, by the second user, via the application programming interface, the at least one TOTP token to the second computing device, the second computing device displaying the at least one TOTP token on a token screen. The method also includes entering, by the first user, via the multi-factor authentication initiation screen, the at least one TOTP token into a corresponding data field of the at least one data field. The method also includes receiving, by the first computing device, from the web-based account, validation of the at least one TOTP token, thereby confirming activation of multi-factor authentication for the web-based account.

In some embodiments, the method includes entering account details, by the first user, into an account details screen displayed via the second computing device. In some embodiments, the account details include an account number and a name for the account. In some embodiments, the second computing device includes a mobile application configured to display the token screen and the account details screen. In some embodiments, the method includes transmitting the account details, by the second computing device, to the application programming interface of the backend system. In some embodiments, the method includes storing, by the backend system, the account details in permanent memory of the backend system. In some embodiments, the method includes receiving confirmation, by the second computing device, from the backend system over the secure communication network, that the account details have been saved and that synchronization of the web-based account with the backend system is complete.

In some embodiments, the secret information is embedded in a Quick Response ("QR") code. In some embodiments, the secret information includes account metadata and a secret key for generating the at least one TOTP token. In some embodiments, transmitting the secret information to the backend system includes determining, based on the Quick Response code, a secret key for generating the at least one TOTP token and transmitting the secret key to the backend system. In some embodiments, only the second user has access to the system that generates the at least one TOTP token and only the first user has access to the account password. In some embodiments, the first computing device is a personal computer and the second computing device is a mobile device. In some embodiments, the backend system includes (i) temporary data storage configured to store the secret information long enough to generate and transmit the at least one TOTP token, and/or (ii) permanent data storage configured to store the external account details permanently (e.g., for as long as the account is active). In some embodiments, if setup fails, the secret information can be released.

In some embodiments, the first user cannot access the multi-factor authentication token generator and the second user cannot access the account password. In some embodiments, the secret information and the at least one TOTP token are transmitted using a secure communication protocol. In some embodiments, the at least one TOTP token includes a first TOTP token and a second TOTP token and the at least one corresponding data field includes a first data field and a second data field. In some embodiments, the first TOTP token and the second TOTP token are generated successively using the same secret information. In some embodiments, two tokens are used for initial setup to verify a secret and not for account access.

In another aspect, the invention includes a TOTP enterprise management system. The system includes a web-based account capable of enabling multi-factor authentication. The system also includes a mobile application configured to assist in receiving first data from, and providing second data to, the web-based account. In some embodiments, the mobile application includes a user interface that provides a proxy layer with respect to the server (e.g., assists in taking in the secret information for setup and displaying one or more TOTP tokens and account details, both for setup and, with appropriate approval from a security team, later use). The first data includes information including secret information. The second data includes at least one TOTP token and account details for the web-based account. The system also includes a backend system in communication with the mobile application via a secure communication network. The backend system includes an enrollment application programming interface for communicating with the mobile application, a token generation module for generating the at least one TOTP token based on the secret information, and an account database for storing the account details.

In another aspect, the invention includes a mobile application for enabling multi-factor authentication for a web-based account. The mobile application includes a first user-facing module configured to scan a QR code, determine a secret key based on the QR code, and transmit the secret key to a backend system. The mobile application also includes a second user-facing module configured to display one or more TOTP tokens transmitted from the backend system. The mobile application also includes a third user-facing module configured to receive account details for the web-based account and transmit the account details to the backend system.

In another aspect, the invention includes a TOTP enterprise management server. The server includes an enrollment application programming interface configured to communicate with an external computing device. The server also includes a TOTP token generating module in communication with the enrollment application programming interface and configured to generate tokens based on secret information transmitted from the external computing device. The server also includes memory for storing an account database having account information, the account database in communication with the enrollment application programming interface. The server also includes an administrative module in communication with the account database. The server also includes a remediation application programming interface in communication with the administrative module and configured to return TOTP tokens based on requests from a user input having the account information. In some embodiments, approval from a security team is necessary for return of one or more TOTP tokens. In some embodiments, information is handled so as to maintain separation of knowledge after use (e.g., with the TOTP token as one of the "keys of the kingdom," the user with the password could "learn" the TOTP token, but the token would only be valid for a certain period of time, ensuring that knowledge is still effectively split). Such a configuration improves upon systems in which the account holder knows the account password and the security team has a hardware MFA device, at least because there can be added expense involved with using a hardware token at setup or to access the account.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis is instead generally placed upon illustrating the principles of the invention.

FIG. 3 is a flowchart of a method of enabling multi-factor authentication for a web-based account, according to an illustrative embodiment of the invention.

DETAILED DESCRIPTION

Figure 1:
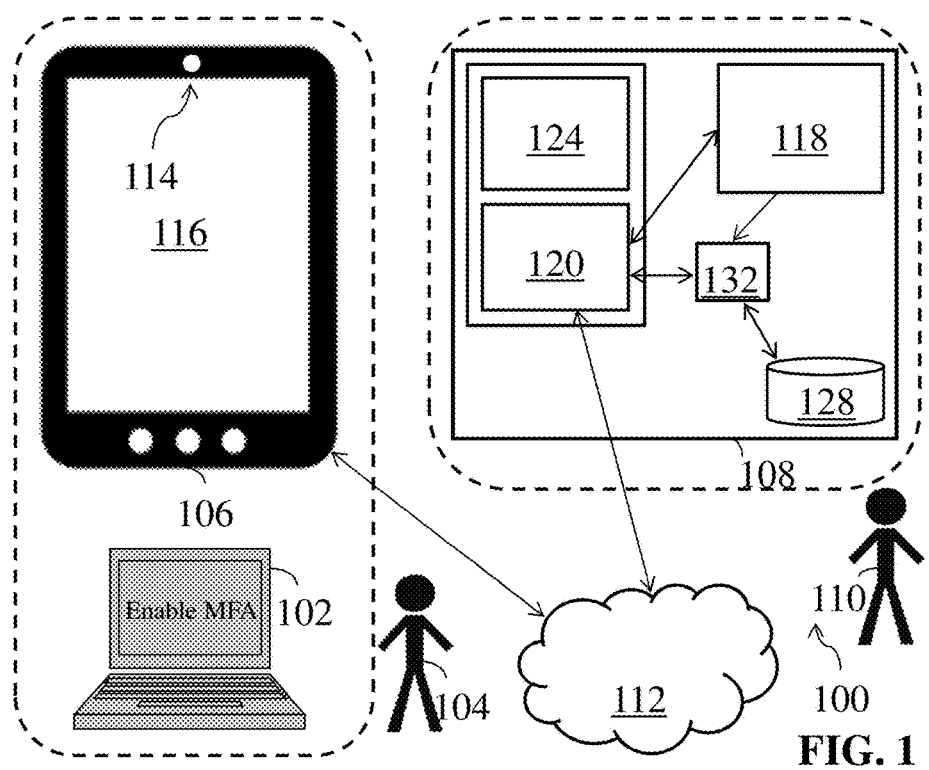
FIG. 1 is a schematic diagram of a web-based account access management system, according to an illustrative embodiment of the invention.

FIG. 1 is a schematic diagram of a web-based account access management system 100, according to an illustrative embodiment of the invention. The account access management system 100 includes three basic modules: a first computing device 102, accessible to a first user 104 (e.g., an account holder) and configured with Internet access; a second computing device 106 (e.g., a mobile phone with a graphical user interface and an installed mobile application), accessible to the first user 104; and a backend system 108 (e.g., a data server) accessible to a second user 110 (e.g., a security official or team). The second computing device 106 is in secure communication with the backend system 108 via a secure communication network 112 (e.g., any form or medium of digital or analog data communication) using a secure communication protocol such as two-way Secure Sockets Layer (SSL) or Transport Layer Security (TLS).

The second computing device 106 has a built-in camera 114 and a screen 116. The second computing device also has a mobile application installed thereon, which is configured to display user-facing screens or modules for the first user 104 and to communicate data to and from backend system 108 via the secure communications network 112. The backend system 108 has a TOTP token generator 118, an external application programming interface (API) 120, a remediation API 124, an account database 128, and an account store 132. The external API 120 is in communication with the TOTP token generator 118 and the account database 128 (e.g., via the account store 132). The TOTP token generator 118 is also in communication with the account store 132. The remediation API 124 is accessible by the second user 110. The functions of these components are further illustrated by the steps shown in FIG. 2 below.

Figure 2:
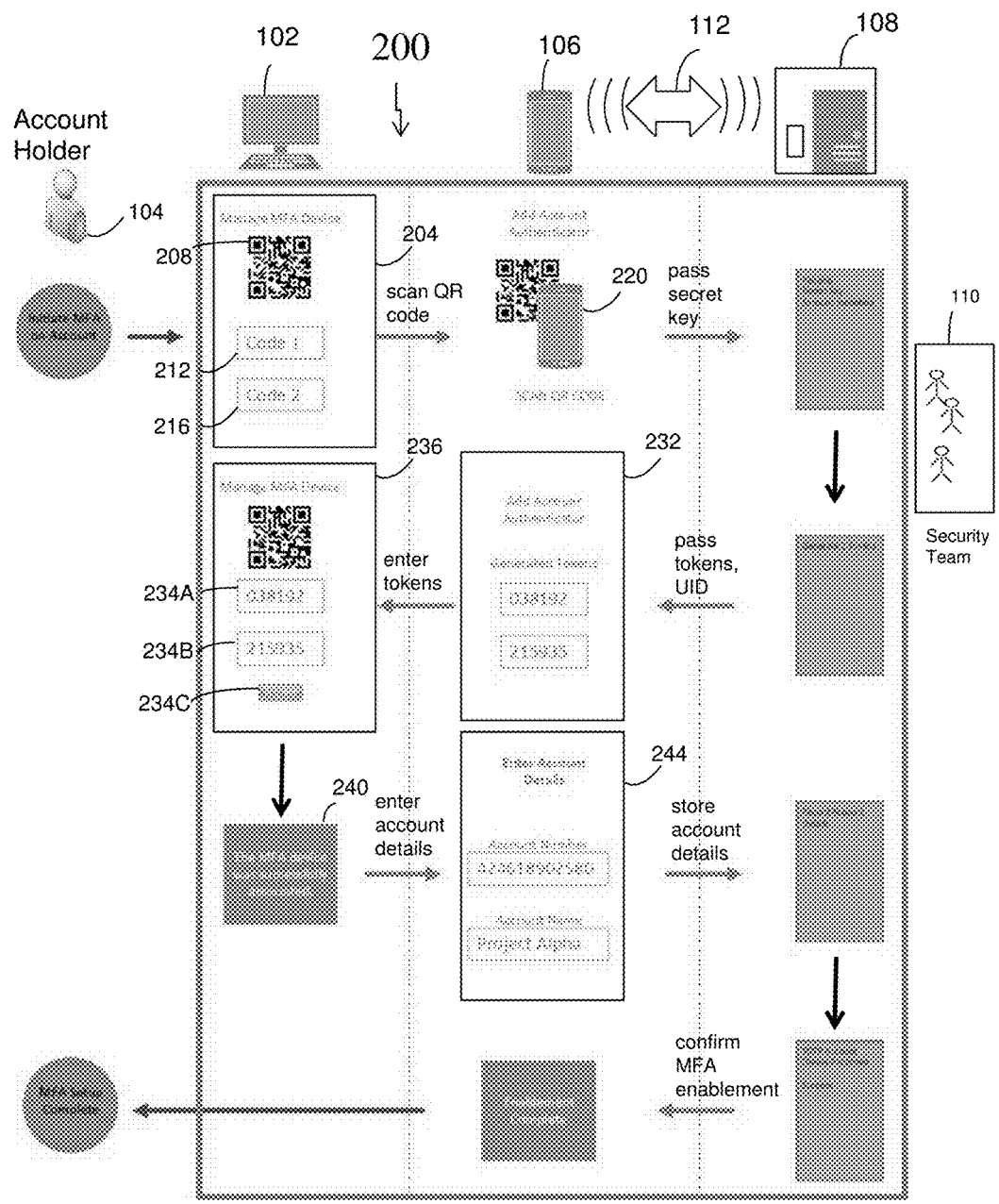
FIG. 2 is a schematic flow diagram showing use of a web-based account access management system, according to an illustrative embodiment of the invention.

FIG. 2 is a schematic flow diagram 200 showing use of a web-based account access management system (e.g., the system 100 shown and described in FIG. 1), according to an illustrative embodiment of the invention. Generally, the three columns of the flow diagram 200 show stages of use associated with one of the above-described components— i.e., the first column is dedicated to the computing device 102; the second column is dedicated to the second computing device 106; and the third column is dedicated to the backend system 108. In the flow diagram 200, arrows flowing from left to right or right to left show process flow (e.g., information exchanged) among these components, and arrows flowing downward show changes happening within components (e.g., displaying screens, processing or recording of data, etc.).

In one embodiment, the account holder 104 (e.g., a project development lead) creates a web-based cloud account (e.g., using the first computing device 102) having a username and password of his or her choice. The account holder 104 then requests to enable virtual MFA for the account. The first computing device 102 displays a MFA initiation screen 204 including a piece of secret information 208 (e.g., a QR code that embeds a secret key used with TOTP token generation and/or other information such as account metadata). The MFA initiation screen also includes at least one data field for entering at least one TOTP token, e.g., a first data field 212 for entering a first TOTP token and a second data field 216 for entering a second TOTP token.

The first user uses the second computing device 106 (including the installed mobile application) to scan the QR code using the camera 114, capturing the shared secret in memory. To aid the first user in scanning the QR code, the second computing device 106 can display a "scan view" screen 220, which can include, e.g., a live feed from the camera 114 to aid the user in positioning the QR code appropriately on the screen 116 for data capture. As one non-limiting example, the camera 114 can be located on the back of the device (e.g., oppositely to the screen 116, which faces the user as shown), and the screen 116 can display a live feed from the camera 114 to aid the user in positioning the QR code on the screen. Once the QR code is captured, the mobile application does not compute the TOTP token itself. Instead, the mobile application extracts from the QR code the secret key and transmits the secret key over the secure communication network 112 to the backend system 108 via the external API 120 of the backend system 108.

After the secret key is passed to the backend system 108, the external API 120 calls upon the token generator 118 to generate at least one TOTP token (e.g., two TOTP tokens generated successively) based on the secret key along with a unique identifier (UID) for the transaction. The TOTP token generator 118 can be based on the RFC 6238 standard or another similar standard recognized in the art. The TOTP token generator 118 is used for account setup only and cannot be used to retrieve TOTP tokens past account setup. The external API 120 then transmits the at least one TOTP token via the communications network 112 to the second computing device 106, which displays the at least one TOTP token on a token screen 232 of the mobile application. The account holder 104 then enters these two tokens into corresponding data fields 234A, 234B in the MFA initiation screen 236 shown by the first computing device 102 and clicks the "Activate" button 234C to complete the setup.

If the setup synchronization is successful, the account holder 104 receives validation from the web-based account of the entered TOTP tokens (e.g., by the "success" screen 240 shown by the first computing device 102), thereby confirming activation of the MFA authentication for the account. At this stage, the mobile application on the second computing device 106 prompts the account holder 104 to enter additional account details for this setup, for example the account number and a name of the account, in an account details screen 244 of the mobile application. The second computing device 106 then transmits the account details to the API 120 of the backend system 108 along with the UID received previously. The backend system 108 saves this information in the account database 128 and confirms to the second computing device 106, over the secure communication network 112, that account setup and synchronization are complete. At this point, only the security team 110 has access to the TOTP generator 118 and only the account holder 104 has access to the account password.

In some embodiments, the first computing device 102 is a personal computer, a laptop, or a mobile phone (e.g., different from or the same as the mobile device 106) and the second computing device is a mobile phone or tablet. In some embodiments, the backend system 108 includes (i) temporary data storage (e.g., in the external API 120) configured to store the shared secret long enough to generate and transmit the at least one TOTP token, and (ii) permanent data storage (e.g., the account database 128) configured to store the external account details permanently. In some embodiments, the first user cannot access the multi-factor authentication token generator 118 and the second user cannot access the account password.

In some embodiments, the mobile application does not store any data in long term memory. Instead, the mobile application communicates data to a set of APIs on the backend system 108, and data is received in real time without being stored permanently. In some embodiments, the remediation API allows for requesting access to the secret key after initial setup. In some embodiments, the set of APIs can process the account information as well as the account secret key. In some embodiments, a request for access is required by the account user and an approval required by the security team, and the set of APIs returns the corresponding TOTPs (but not the secret key). In some embodiments, the backend system 108 has two tables: an account store, used for enrollment; and a permanent store (e.g., the database 128) marked for account details. In some embodiments, the permanent store can be split up to maintain heightened security (e.g., the secret key information can be stored in encrypted form in one data store, while the account information is stored in encrypted form in a different data store).

FIG. 3 is a flowchart of a method 300 of enabling multi-factor authentication for a web-based account, according to an illustrative embodiment of the invention. In a first step 305, the following are provided: a first computing device accessible to a first user and configured with Internet access, a second computing device accessible to the first user, and a backend system accessible to a second user. The backend system is in communication with the second computing device via a secure communication network and has a TOTP token generator and an application programming interface. In a second step 310, the first user creates a web-based account having a username and a password. In a third step 315, the first user requests, via the first computing device, to enable multi-factor authentication for the web-based account. In a fourth step 320, the first computing device displays for the first user a multi-factor authentication initiation screen including secret information and at least one data field for entering at least one TOTP token. In a fifth step 325, the second computing device captures the secret information in memory. In a sixth step 330, the second computing device transmits the secret information over the secure communication network to the backend system via the application programming interface. In a seventh step 335, the second user generates, using the TOTP token generator, the at least one TOTP token. In an eighth step 340, the second user transmits, via the application programming interface, the at least one TOTP token to the second computing device, the second computing device displaying the at least one TOTP token on a token screen. In a ninth step 345, the first user enters, via the multi-factor authentication initiation screen, the at least one TOTP token into a corresponding data field of the at least one data field. In a tenth step 350, the first computing device receives, from the web-based account, validation of the at least one TOTP token, thereby confirming activation of multi-factor authentication for the web-based account.

It should also be understood that various aspects and embodiments of the technology can be combined in various ways. Based on the teachings of this specification, a person of ordinary skill in the art can readily determine how to combine these various embodiments. In addition, modifications may occur to those skilled in the art upon reading the specification.

What is claimed is:

1. A computerized method of enabling multi-factor authentication for a web-based account, the method comprising:
    providing a first computing device accessible to a first user and configured with Internet access, a second computing device accessible to the first user, and a backend system accessible to a second user, the backend system in communication with the second computing device via a secure communication network, the backend system having a time-based one-time password (TOTP) token generator and an application programming interface;
    creating, by the first user, a web-based account having account details including a username and an account password;
    requesting, by the first user, via the first computing device, to enable multi-factor authentication for the web-based account;
    displaying, for the first user, via the first computing device, a multi-factor authentication initiation screen including secret information and at least one data field for entering at least one TOTP token;
    capturing, by the second computing device, the secret information in memory;
    transmitting, by the second computing device, the secret information over the secure communication network to the backend system via the application programming interface;
    generating, by the second user, using the TOTP token generator, the at least one TOTP token;
    transmitting, by the second user, via the application programming interface, the at least one TOTP token to the second computing device, the second computing device displaying the at least one TOTP token on a token screen;
    entering, by the first user, via the multi-factor authentication initiation screen, the at least one TOTP token into a corresponding data field of the at least one data field; and
    receiving, by the first computing device, from the web-based account, validation of the at least one TOTP token,
    wherein only the first user has access to the account password and only the second user has access to the TOTP token generator.

2. The method of claim 1 further comprising entering account details, by the first user, into an account details screen displayed via the second computing device.

3. The method of claim 2 wherein the account details include an account number and a name for the account.

4. The method of claim 2 wherein the second computing device includes a mobile application configured to display the token screen and the account details screen.

5. The method of claim 2 further comprising transmitting the account details, by the second computing device, to the application programming interface of the backend system.

6. The method of claim 5 further comprising storing, by the backend system, the account details in permanent memory of the backend system.

7. The method of claim 6 further comprising receiving confirmation, by the second computing device, from the backend system over the secure communication network, that the account details have been saved and that synchronization of the web-based account with the backend system is complete.

8. The method of claim 1 wherein the secret information is embedded in a Quick Response code.

9. The method of claim 8 wherein the secret information includes account metadata and a secret key for generating the at least one TOTP token.

10. The method of claim 8 wherein transmitting the secret information to the backend system includes determining, based on the Quick Response code, a secret key for generating the at least one TOTP token and transmitting the secret key to the backend system.

11. The method of claim 1 wherein only the second user has access to the system that generates the at least one TOTP token and only the first user has access to the account password.

12. The method of claim 1 wherein the first computing device is a personal computer and the second computing device is a mobile device.

13. The method of claim 1 wherein the backend system includes (i) temporary data storage configured to store the secret information long enough to generate and transmit the at least one TOTP token, and (ii) permanent data storage configured to store the external account details permanently.

14. The method of claim 1 wherein the secret information and the at least one TOTP token are transmitted using a secure communication protocol.

15. The method of claim 1 wherein the at least one TOTP token includes a first TOTP token and a second TOTP token and the at least one corresponding data field includes a first data field and a second data field.

16. The method of claim 15 wherein the first TOTP token and the second TOTP token are generated successively using the same secret information.

17. A TOTP enterprise management system comprising:
a first computing device accessible to a first user and configured with Internet access, the first computing device configured to (i) create a web-based account having account details including a username and an account password, the web-based account capable of enabling multi-factor authentication, (ii) request to enable multi-factor authentication for the web-based account, (iii) display a multi-factor authentication initiation screen including secret information and at least one data field for entering at least one TOTP token, (iv) receive at least one TOTP token via the at least one data field, and (v) receive from the web-based account validation of the at least one TOTP token;
a second computing device accessible to the first user, the second computing device including a mobile application stored in memory of the second computing device, the mobile application configured to (i) capture the secret information in memory, (ii) transmit the secret information via the mobile application, (iii) receive the at least one TOTP token, and (iv) display the at least one TOTP token on a token screen; and
a backend server computer accessible to a second user, the backend server computer in communication with the second computing device via a secure communication network, the backend server computer including an application programming interface for communicating with the mobile application of the second computing device, a token generation module for generating the at least one TOTP token based on the secret information and transmitting the at least one TOTP token to the second computing device, and an account database for storing the account details,
wherein only the first user has access to the account password and only the second user has access to the token generation module.

18. A mobile application enabling multi-factor authentication for a web-based account, the web-based account having details including a username and an account password and being accessible to a first user via a first computing device configured with Internet access, the mobile application comprising:
a first user-facing module stored in memory of a second computing device and accessible to the first user, the first user-facing module (i) capturing secret information provided by a multi-factor authentication initiation screen displayed via the first computing device, the multi-factor authentication screen including secret information and at least one data field for receiving at least one TOTP token and (ii) transmitting the secret information to a backend system in secure communication with the second computing device via an application programming interface of the backend system;
a second user-facing module stored in memory of the second computing device and accessible to the first user, the second user-facing module displaying one or more TOTP tokens generated by and transmitted from a TOTP token generator of the backend system for entering, by the first user, into the multi-factor authentication initiation screen displayed via the first computing device; and
a third user-facing module accessible to the first user and stored in memory of the second computing device, the third user-facing module receiving account details for the web-based account, the web-based account providing to the first computing device validation of the one or more TOTP tokens,
wherein only the first user has access to the account password and only the second user has access to the TOTP token generator.

19. A TOTP enterprise management server for enabling multi-factor authentication for a web-based account, the web-based account having account details including a username and an account password and created by and accessible to a first user via a first computing device configured with Internet access, the TOTP enterprise management server in secure communication with a second computing device that is accessible to the first user, the TOTP enterprise management server comprising:
an enrollment application programming interface stored in memory of the TOTP enterprise management server and configured to communicate with the second computing device, the enrollment application programming interface receiving secret information from a multi-factor authentication initiation screen displayed for the first user on the first computing device and captured in memory of the second computing device;
a TOTP token generating module stored in memory of the TOTP enterprise management server and accessible by a second user, the TOTP generating module in communication with the enrollment application programming interface, the TOTP token generating module generating one or more TOTP tokens based on secret information transmitted from the second computing device, the one or more TOTP tokens being displayed on a token screen of the second computing device, the first user entering the one or more TOTP tokens into one or more corresponding data fields of the multi-factor authentication initiation screen;
memory for storing an account database having account information, the account database in communication with the enrollment application programming interface;
an administrative module stored in memory of the TOTP enterprise management server, the administrative module in communication with the account database; and
a remediation application programming interface stored in memory of the TOTP enterprise management server, the remediation application programming interface in communication with the administrative module and configured to return one or more TOTP tokens based on requests from a user input having the account information,
wherein only the first user has access to the account password and only the second user has access to the TOTP token generating module.

* * * * *